United States Patent
Gangi

(10) Patent No.: US 6,402,029 B1
(45) Date of Patent: Jun. 11, 2002

(54) METHOD AND APPARATUS FOR COMBINING DATA FOR MULTIPLE MAGNETIC STRIPE CARDS OR OTHER SOURCES

(75) Inventor: Frank J. Gangi, Frisco, TX (US)

(73) Assignee: E-Micro Corporation, Frisco, TX (US)

( * ) Notice: Subject to any disclaimer, the term of this patent is extended or adjusted under 35 U.S.C. 154(b) by 0 days.

(21) Appl. No.: 09/664,205

(22) Filed: Sep. 18, 2000

Related U.S. Application Data

(63) Continuation-in-part of application No. 09/087,193, filed on May 29, 1998, now Pat. No. 6,131,811.

(51) Int. Cl.$^7$ .................................................. G06K 5/00
(52) U.S. Cl. ........................................ 235/380; 235/492
(58) Field of Search ................................ 235/380, 492

(56) References Cited

U.S. PATENT DOCUMENTS

| | | |
|---|---|---|
| 4,701,601 A | 10/1987 | Francini et al. |
| 4,705,211 A | 11/1987 | Honda et al. |
| 4,837,422 A | 6/1989 | Dethloff et al. |
| 4,868,376 A | 9/1989 | Lessin et al. |
| 5,095,196 A | 3/1992 | Miyata |
| 5,135,095 A | 8/1992 | Kocznar et al. |
| 5,276,311 A | 1/1994 | Hennige |
| 5,585,787 A | 12/1996 | Wallerstein |
| 5,895,903 A | 4/1999 | Abe et al. |
| 6,131,811 A | * 10/2000 | Gangi ........................ 235/380 |

FOREIGN PATENT DOCUMENTS

| | | |
|---|---|---|
| EP | 0656600 A2 | 6/1995 |
| EP | 0656600 | * 6/1995 |
| WO | WO 98/10363 | 3/1998 |
| WO | WO 98/12675 | 3/1998 |

OTHER PUBLICATIONS

Towitoko Electronics, "Product Overview Smartcard Terminals & Systems", Feb., 1998.
Dr. Klaus Vedder and Dr. Franz Weikmann, Giesecke & Devrient, "Smart Card—Requirements, Properties and Applications", 1998.
"ActivCard", ActivCard, Inc. 1998.
OKI Advanced Products, OKI America, Inc. "Value–Checker™ CP", 1998.
Logis Chipcard Products, "Logismart Chipcard Readers— Worth Your Attention", 1998.
Setec Oy, "Setpurse™", 1998.
NURI Information & Communication Inc., "NURI Smart Card Solutions", 1998.

* cited by examiner

Primary Examiner—Harold I. Pitts
(74) Attorney, Agent, or Firm—Smith, Danamraj & Youst, P.C.

(57) ABSTRACT

A method of writing additional foreign data either to a blank magnetic card and/or to an existing magnetic striped card is used to consolidate information from possibly multiple credit type cards onto a single card. The additional data that may be from multiple cards or that may be generated or gathered from other sources can then be written to a single card for example to consolidate the information.

6 Claims, 3 Drawing Sheets

MAGNETIC STRIPE TIMING TRACK USED TO ELIMINATE OPTICAL ENCODER

| | RECORDING DENSITY (bits per inch) | CHARACTER CONFIGURATION (including parity bit) | INFORMATION CONTENT (including control characters) |
|---|---|---|---|
| 0.110" TRACK 1 IATA | 210 BPI | 7 BITS PER CHARACTER | 79 ALPHANUMERIC CHARACTERS |
| 0.110" TRACK 2 ABA | 75 BPI | 5 BITS PER CHARACTER | 40 NUMERIC CHARACTERS |
| 0.110" TRACK 3 THRIFT | 210 BPI | 5 BITS PER CHARACTER | 107 NUMERIC CHARACTERS |

| SS | FC | PAN | FS | NAME | FS | ADDITIONAL DATA | | DISCRETIONARY DATA | | ES | LRC |
|---|---|---|---|---|---|---|---|---|---|---|---|
| | | Primary Account No. (19 digits Max) | | Name (26 alphnumeric characters Max) | | | NO. OF CHARACTERS | | NO. OF CHARACTERS | | |
| | | | | | | Expiration Date (YYMM) | 4 | PVKI | 1 | | |
| | | | | | | Service Code | 3 | PW OR Offset | 4 | | |
| | | | | | | | | CW or CVC | 3 | | |
| | | | | | | | | Same or all of the above fields may be found within the Discretionary data. | | | |

←—— 76 ALPHA NUMERIC DATA CHARACTERS ——→

← 37 ALPHA NUMERIC DATA CHARACTERS →

| SS | PAN | FS | ADDITIONAL DATA | DISCRETIONARY DATA | ES | LRC |

PAN: Primary Account No. (19 digits Max)

ADDITIONAL DATA — NO. OF CHARACTERS:
- Expiration Date (YYMM) — 4
- Service Code — 3

DISCRETIONARY DATA — NO. OF CHARACTERS:
- PVK1 — 1
- PW OR Offset — 4
- CVV or CVC — 3
- Some or all of the above fields may be found within the Discretionary data.

FIG. 5

← 104 ALPHA NUMERIC DATA CHARACTERS →

| SS | FC | PAN | FS | USE AND SECURITY DATA | ADDITIONAL DATA | ES | LRC |

PAN: Primary Account No. (19 digits Max)

USE AND SECURITY DATA — NO. OF CHARACTERS:
- Country Code (opt.) — 3
- Currency Code — 3
- Currency Exponent — 1
- Amount Authorized per Cycle — 4
- Amount Remaining this Cycle — 4
- Cycle Begin (Validity Date) — 4
- Cycle Length — 2
- Retry Count — 1
- PIN Control Parameters — 6
- Interchange Control — 1
- PAN Service Restriction — 2
- SAN-1 Service Restriction — 2
- SAN-2 Service Restriction — 2
- Expiration Date (opt.) — 4
- Card Sequence Number — 1
- Card Security Number (opt.) — 9

ADDITIONAL DATA — NO. OF CHARACTERS:
- First Subsidiary Account Number (opt.) —
- Secondary Susidiary Account Number (opt.) —
- Relay Marker — 1
- Cryptographic Check Digits (opt.) — 6
- Discretionary Data

METHOD AND APPARATUS FOR COMBINING DATA FOR MULTIPLE MAGNETIC STRIPE CARDS OR OTHER SOURCES

CROSS REFERENCE TO RELATED APPLICATIONS

This application is a continuation in part of U.S. patent application Ser. No. 09/087,193 filed May 29, 1998 now U.S. Pat. No. 6,131,811 and hereby incorporates by reference all material therein.

TECHNICAL FIELD THE INVENTION

This invention relates generally to an improvement for the use of magnetic striping on devices such as credit cards and the like, and in particular, but not by way of any limitation to a methodology and improved magnetic stripe card which is capable of encoding additional information other than that originally presented on the card.

BACKGROUND OF THE INVENTION

In today's electronic commerce there has been a proliferation in the use of various types of credit, debit, identification and other types of authorization cards. For example, an average individual is likely to carry a driver's licence, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Prior art magnetic stripe credit cards and the like have various limitations. For example, virtually all the prerecorded magnetic stripe cards that are currently in use are used for a single purpose. For example, a credit card or an identity card is generally used for just that purpose alone. In many instances, owners and users of these type of cards need to present several cards in order to maximize or complete a given transaction. Specifically, a discount card such as is used in certain supermarkets as well as the credit card to make the purchase must be both presented so as to obtain the discount.

Various solutions such as providing a sticker which can be placed on a credit card or the like have been suggested, however, these defeat the purpose of having an increased level of automation for check outs for example.

Accordingly, the inventor herein proposes a solution which is both cost efficient and time efficient and which allows the use of conventional types of magnetic stripe readers which are currently being used in most retail establishments. The invention herein also allows that a single swipe of the card through the magnetic strip reader can provide all the information in one pass. This can be accomplished by recording onto the conventional magnetic stripe of the credit card, the desired data from multiple cards and other sources which are necessary to complete a chosen transaction.

SUMMARY OF THE INVENTION

This invention uses a method and apparatus for providing onto the magnetic stripe of a card additional information and consolidating multiple information from multiple cards as well as other sources onto the magnetic stripe card. To do so a wallet consolidator such as is shown in co-pending U.S. patent application Ser. No. 09/087,193 filed May 29, 1998 (for which a Notice of Allowance has been issued) can be employed although other types of readers and writers can be used to generate this data and this invention should in no way be considered to be limited to the use of the specific wallet consolidator mentioned above. Specifically, a device such as the wallet consolidator can be used in which the magnetic stripe information from multiple credit cards can be read from what is generally the commonly used three ISO/8711 tracks that are present on the card. However, it should be noted that in many types of credit cards one or more of these tracks may have no data provided on the card. What then can be accomplished is the reading of multiple tracks from multiple cards storing this all in memory and then rewriting the information to either a blank card or to the existing card after erasing the information along with, if necessary, additional "foreign" data onto the card. In an other embodiment it may be possible to write the additional foreign data on an existing card without an erasure and re-writing of the data, however this is not the preferred mode of operation.

In one embodiment of this invention, the foreign data is placed at the end of any data which was originally on the track or on an empty track. It may also be placed at any other position that the reading software in a point of sale (POS) terminal would have or would find to be ideal, this could also be at the front of a track for example or embedded within the track. The data of each track is formatted with a start sentinel character followed by the data itself followed by a stop sentinel. Conventional magnetic swipe readers, which are presently used, look for the start or stop sentinel to indicate that a body of data follows. It should be noted however, that some readers will read the data irrespective of which way the card is swiped through the reader. The electronic circuitry in these type of readers know which way the swipe is being done by whether a start or stop sentinel is received first. This means that foreign data placed after the stop sentinel will not be recognized if it is not bracketed by standard start and stop sentinels.

The standard ISO-8711 standard (a copy of which is supplied hereto as an appendix) specifies that at least two machine control codes for each type of track specifically, the types of tracks can be for example 75 or 210 bpi. These control codes and be used to bracket the foreign data. It would then be possible to design the reader that will look for data bracketed by the special control codes and/or designed software that will look for the data bracketed by these special control codes after a standard stop sentinel. Foreign data such as a coupon information, a discount card number or the like may be written in any track that was originally unused or even if used after a stop sentinel is present, and if that foreign data is bracketed by these special control codes then the foreign data will not be read by standard magnetic swipe readers and therefore will be ignored. However, special readers in the software at the host computer for the transaction can look for these control codes and then confine the foreign data and organize it in a manner acceptable for multiple purposes in the individual cards. This makes it possible to have additional information placed on the magnetic stripe card which would not be read by conventional readers in the field but would be obtainable from specialized readers.

BRIEF DESCRIPTION OF THE DRAWINGS

The novel features of the present invention will be understood and appreciated by one of ordinary skill in the art by reference to the following detailed description of the invention taken in conjunction with the accompanying drawings and which:

FIG. 2 is a layout of the conventional ISO track diagram;

FIG. 3, 4, and 5 are more detailed descriptions of the track layout under a standard ISO-8711 standard.

DETAILED DESCRIPTION OF THE INVENTION

Figure 1:
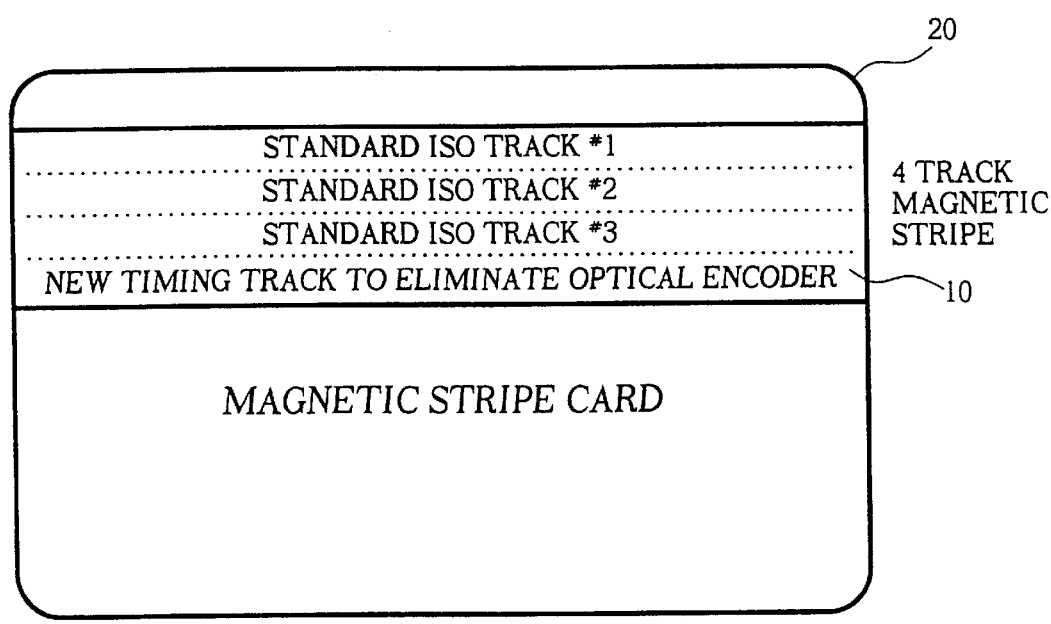
FIG. 1 is a track layout in accordance with this invention.

Referring now to drawings where like or similar elements are designated with identical reference numbers. In FIG. 1 it can be seen that an additional timing track 10 can be employed on a card 20 in this invention which may be used to ameliorate the need of an optical encoder in a device such as the wallet consolidator discussed above or in other types of readers. This is provided in that most conventional magnetic stripe readers use a mechanical sensor or optical sensor which is used to detect the speed at which the magnetic stripe card is being read through the stripe reader. By having an additional timing track supplied as an additional track the inventor herein has provided a means by which the reader can be made at a lower cost by using the timing track herein to determine the timing arrangement. However, this additional timing track 10 is not necessary for the operation of this invention, and in fact the conventional encoding and timing mechanism are quite satisfactory.

One of the significant features of this invention is that multiple stripes from various credit cards can be read and consolidated onto one card as is set forth in aforementioned wallet consolidator patent application. One of the unique features of this invention is the ability to take foreign or other sources and to add that material onto a given track on the card. The wallet consolidator uses the individual memory chip or smart chip contained on a card to store information however, this information can also be temporarily stored in the memory of a device such as the wallet consolidator and added to the magnetic stripe. One of the unique features of applicant's invention is the use of the fact that a standard track of one card data format, has an amount of information which is known as discretionary data which can be placed on any given card in any one of the standard three tracks. By using the control code to indicate the type of track is in a different format at using these control codes to "bracket" an individual stream of data and placing this after a standard stop sentinel on a data track a conventional reader would inherently ignore the information contained within this section. However, a specially constructed reader/writer would be able to look for or create these special control codes or the software within the conventional reader could be altered so that upon recognition of these special control codes this additional information could be decoded. This allows for a "hiding" of additional information which can be consolidated onto a given card to be employed and used in a very expeditious manner. Further it will be understood that the sentinals described above need not be employed to practice this invention and that other types of software codes can be used so that a POS terminal either as they exist today or with custom reprogramming can be used to read the additional or foreign information that is to be "added" to conventional tracks. The start and stop sentials have been described herein as only an example of the types of control codes that can be used to bracket the foreign data that is to be added to the card stripe. Further a control code could be programmed into the stripe that can be recognized by the POS reader to indicate that this is for example a credit card, a second code could indicate that this is a discount or affinity card, and yet a third code could indicate that this is a drivers license. These codes could also be combined in various ways. Prior art systems have not used these special control codes to effectively hide additional data on a given track. This additional information can be used effectively.

This can be made more clear when one reviews FIGS. 3, 4 and 5 which shows the significant amount of space that is available for "either discretionary data or additional data" on a given track. This is especially true when the 210 bpi track is used. The additional either alpha numeric or numeric characters provides a significant amount of space for additional data to be placed on a given card which has been unavailable in prior art systems. Additionally, as the control code can be used to effectively "shift" the track concentration from 75 to 210 bpi in the middle of the track additional information can be "hidden" as still be provided to a specially outfitted or programmed reader. Accordingly, additional data can be used and be present on a card which would not be generally readable without the proper equipment or programming.

It will readily be understood by one of ordinary skill in the art that multiple uses of this additional data can be had. Further, it will readily understood that there are numerous rearrangements, modifications or substitutions which are possible and this invention should not be limited without departing from the spirit of this invention as set forth above and defined by the following appended claims:

What is claimed is:

1. A magnetically encoded card comprising:
    at least one track originally containing data;
    at least some additional data written on said track placed between a set of special control codes, wherein said additional data is written on said card at a time subsequent to the initial data being placed on said one track.

2. A card as in claim 1 wherein the additional data written is written at a different track density from the original data.

3. A card as in claim 1 wherein the additional data written is written at the same track density as the original data.

4. A card as in claim 1 wherein said additional data comprises:
    affinity data.

5. A card as in claim 1 wherein said additional data comprises:
    account data.

6. A card as in claim 1 wherein said additional data comprises:
    identification data.

* * * * *